United States Patent
Gritti et al.

(10) Patent No.: US 8,810,360 B2
(45) Date of Patent: Aug. 19, 2014

(54) METHOD AND APPARATUS FOR CONTROLLING THE STATUS OF A DEVICE

(75) Inventors: Tommaso Gritti, Eindhoven (NL); Steven Leonardus Josephus Dimphina Elisabeth Van De Par, Goirle (NL)

(73) Assignee: TP Vision Holding B.V., Eindhoven (NL)

( * ) Notice: Subject to any disclaimer, the term of this patent is extended or adjusted under 35 U.S.C. 154(b) by 48 days.

(21) Appl. No.: 13/498,623

(22) PCT Filed: Nov. 9, 2010

(86) PCT No.: PCT/IB2010/055073
§ 371 (c)(1),
(2), (4) Date: Mar. 28, 2012

(87) PCT Pub. No.: WO2011/067691
PCT Pub. Date: Jun. 9, 2011

(65) Prior Publication Data
US 2012/0229249 A1    Sep. 13, 2012

(30) Foreign Application Priority Data
Dec. 4, 2009 (EP) ..................... 09177972

(51) Int. Cl.
*G05B 19/02* (2006.01)
(52) U.S. Cl.
USPC .......... 340/4.34; 340/522; 340/521; 340/552; 307/117; 307/116; 307/140; 315/149; 315/159; 315/308; 362/276; 362/802

(58) Field of Classification Search
USPC .......... 307/117, 116, 140, 115; 315/360, 362, 315/159, 308, 149, 291, 297, 307; 362/276, 362/802; 455/456.1–456.6
See application file for complete search history.

(56) References Cited

U.S. PATENT DOCUMENTS

| 4,751,399 A | 6/1988 | Koehring et al. |
| 2003/0025082 A1 * | 2/2003 | Brewington et al. ...... 250/341.8 |
| 2008/0278583 A1 | 11/2008 | Evenson, II |
| 2009/0046537 A1 | 2/2009 | Chen et al. |

FOREIGN PATENT DOCUMENTS

| DE | 3843047 A1 | 7/1989 |
| DE | 10134305 B4 | 5/2002 |
| DE | 10138609 B4 | 2/2005 |
| DE | 102008020416 B3 | 9/2009 |
| WO | 2009003279 A1 | 1/2009 |

\* cited by examiner

*Primary Examiner* — Steven Lim
*Assistant Examiner* — Hongmin Fan
(74) *Attorney, Agent, or Firm* — Shimokaji & Assoc., P.C.

(57) ABSTRACT

The status of a device is controlled by detecting (403) the presence of a user; changing the status of a device to a first state (405) if the presence of a user is detected within a first, predetermined zone; changing the status of the device to the second state (407) if the presence of a user is detected outside a second, predetermined zone, the first, predetermined zone being smaller than and being wholly contained within the second, predetermined zone; and maintaining (407) the current state of the device if the presence of a user is detected outside of the first, predetermined zone and within the second predetermined zone.

10 Claims, 3 Drawing Sheets

METHOD AND APPARATUS FOR CONTROLLING THE STATUS OF A DEVICE

FIELD OF THE INVENTION

The present invention relates to method and apparatus for controlling the status of a device. In particular, but not exclusively, it relates to automatically activating a device as a user approaches the device or a predefined region and deactivating the device as a user retreats.

BACKGROUND OF THE INVENTION

Many systems exist which trigger an automatic response from a device. These systems allow user interaction, based upon, either the distance of the user to the device, or a predefined position of the user with respect to the device. This may, for example, involve activating a screen containing a welcome message, turning on a light, playing a sound, etc. When the user leaves the area of the device, the system is reset to a default state (for example the screen is turned off, lights are turned off, etc.).

Specific applications are found extensively in automatic lighting control. A presence detector is capable of detecting if a user enters a predefined zone such as a room. Once such an event is detected, a particular lighting condition is applied to the zone. This may include functional light for creating a particular atmosphere.

Another specific application relates to activation of a user interface such as a computer system, television, media players, hi-fi, etc. In this case, the distance of the user with respect to the user interface is detected and once the distance is less than a certain threshold, the user interface is activated and may show a welcome message on screen, and optionally gesture control is activated. Once the user is at a distance outside the range of the threshold, the user interface is turned off.

In the above existing systems, one approach to operate the system is to select a desired distance range/area inside which the system should be activated; if the user steps inside this zone, the system is activated; and if the user steps out of this zone, the system is deactivated.

While this technique is intuitive, it has disadvantages. If a user enters a zone, but does not proceed further (i.e. the user remains very close to the boundary of the zone), a very small movement away from the boundary will trigger the system to go back to the initial/default state. From that point, a very small movement toward the zone boundary will trigger yet another change of state, and so forth making the behaviour of the system very unstable as it flickers on and off etc. This effect is illustrated in FIGS. 1a-d and 2a-d.

FIGS. 1a-1d illustrates the effect of large movements of the user with respect to an activation zone of an existing system. In FIG. 1a, a device 101 comprises an activation zone 103. A user 105 is located outside of the activation zone 103 and consequently the device 101 is turned off. As the user 105 enters the activation zone 103, crosses the boundary of the activation zone 103, as shown in FIG. 1b, the device 101 is activated. As the user 105 continues to move toward the device 101 and completely enters the activation zone 103, as shown in FIG. 1c, the device 101 remains activated. When the user 105 leaves the activation area 103, as shown in FIG. 1d, the device 101 is deactivated. Therefore, the system behaves as expected such that the device 101 is activated and remains activated whilst the user 105 is within the activation zone 103 and is deactivated and remains deactivated whilst the user 105 is outside the activation zone 103.

However, in the event of smaller movements of the user problems arise in such systems as illustrated in FIGS. 2a-d. Similar to FIG. 1a, FIG. 2a shows the user 105 located outside the activation zone 103 of the device 101. The device 101 is deactivated, turned off. As the user 105 approaches the activation zone 103, as shown in FIG. 2b, the device 101 is activated. If the user 105 then remains in the area of the boundary of the activation zone 103, a small movement of the user 105 in this area may cause the user 105 to be detected as outside the activation 103, as shown in FIG. 2c. Consequently, the device 101 is deactivated. These small movements may equally detect that the user 105 is within the activation zone 103, as shown in FIG. 2d, which then activates the device 101. As a result the small movements of the user 105 in the area of the boundary of the activation zone 103, causes flickering of the device 101 between on and off which is annoying and confusing to the user.

This is partly overcome by use of a timer, so that, only after a predetermined time interval, the switch to the default state is triggered. Therefore, small rapid movements back and forth will not trigger the device to turn on and off with each movement. However, even in this case, a problem remains: if the user is close to the boundary and moves away a very small amount, the system will reset itself after a delay, making the interaction non intuitive. If the timer is set too long, the interaction state of (lighting or user interface device) will remain on for too long, making it not practical and inefficient.

SUMMARY OF THE INVENTION

The present invention seeks to provide automatic control of a device which is more stable, intuitive to use and energy efficient.

This is achieved according to a first aspect of the present invention by a method for controlling the status of a device, the method comprising the steps of: detecting the presence of a user; changing the status of a device to a first state if the presence of a user is detected within a first, predetermined zone; changing the status of the device to the second state if the presence of a user is detected outside a second, predetermined zone, said first, predetermined zone being smaller than said second, predetermined zone and said first, predetermined zone being wholly contained within said second, predetermined zone; and maintaining the current state of the device if the presence of a user is detected outside of the first, predetermined zone and within the second predetermined zone.

This is also achieved according to a second aspect of the present invention by apparatus for controlling the status of a device, the apparatus comprising: a detector for detecting the presence of a user; a controller for changing the status of a device to a first state if the presence of a user is detected within a first, predetermined zone, changing the status of the device to a second state if the presence of a user is detected outside a second, predetermined zone, said first, predetermined zone being smaller than said second, predetermined zone and said first, predetermined zone being wholly contained within said second, predetermined zone, and maintaining the current state of the device if the presence of a user is detected outside of the first, predetermined zone and within the second predetermined zone.

This is also achieved according to a third aspect of the present invention by a system for controlling the status of a device, the system comprising: a controllable device; a detector for detecting the presence of a user; a controller for changing the status of the controllable device to a first state if the presence of a user is detected within a first, predetermined zone, changing the status of the controllable device to a second state if the presence of a user is detected outside a second, predetermined zone, said first, predetermined zone being smaller than said second, predetermined zone and said first, predetermined zone being wholly contained within said second, predetermined zone, and maintaining the current state of the controllable device if the presence of a user is detected outside of the first, predetermined zone and within the second predetermined zone.

Maintaining the current state of the device if the user is in the area defined between a first and second zone introduces a hysteresis effect. As a result if the user is in the area of the boundary between activation/deactivation, the current state (for example turned on or off) is maintained. As such the system is more stable making it more intuitive and more enjoyable to use and more energy efficient. Although reference is made to activation and deactivation of the device other settings of the device may be effected by the relative position of the user, for example, brightness levels of lighting, size of text on a screen etc.

In an embodiment, the speed of travel of a user detected within the second, predetermined zone or the first predetermined zone may be determined; and detecting the user as present within the second, predetermined zone or the first, predetermined zone if the determined speed of travel is below a predetermined threshold value. This helps to reduce false trigger of the device for a user who passes quickly within the first or second, predetermined zone and has no interest in using the device.

The speed of travel of a user may be determined by detecting a first location of the user within the second, predetermined zone or the first predetermined zone; detecting a second location of the user within the second, predetermined zone or the first predetermined zone after a predetermined time interval; and determining the speed of travel of the detected user from the distance between the first and second locations and the predetermined time interval. Therefore, additional sensory equipment is not required to determine speed of travel as it can be simply determined by distance measurements which may also be used to detect the presence of the user.

The first, predetermined zone and the second, predetermined zone may be located within a vicinity of the device.

The detector may comprise at least one of an ultra sound sensor; passive infra-red sensor, radar video cameras, depth-sensing camera, audio sensors or a combination thereof. Thus the presence of the user is detected using known, available and reliable technology.

BRIEF DESCRIPTION OF DRAWINGS

For a more complete understanding of the present invention, reference is made to the following description in conjunction with the accompanying drawings, in which.

DETAILED DESCRIPTION OF EMBODIMENTS OF THE INVENTION

Figures 1A, 1B, 1C, 1D:
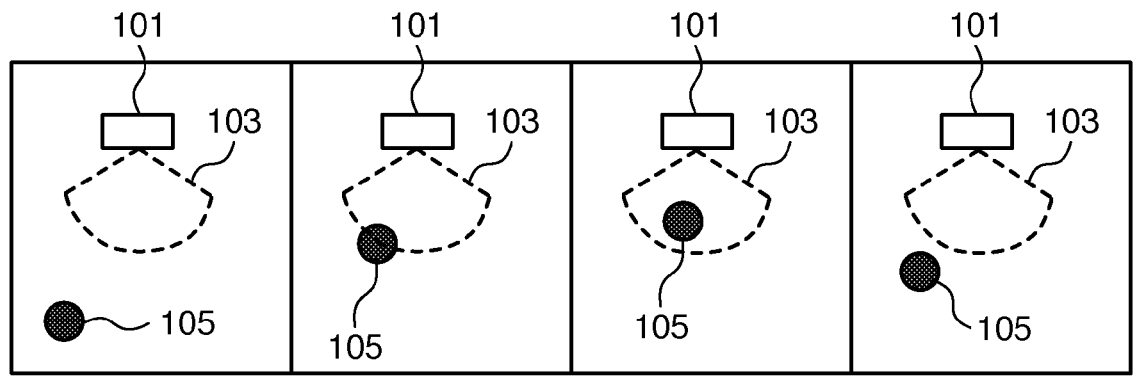
FIGS. 1a-d are simple schematics illustrating operation of an existing system in which large movements of the user are detected.
Figures 2A, 2B, 2C, 2D:
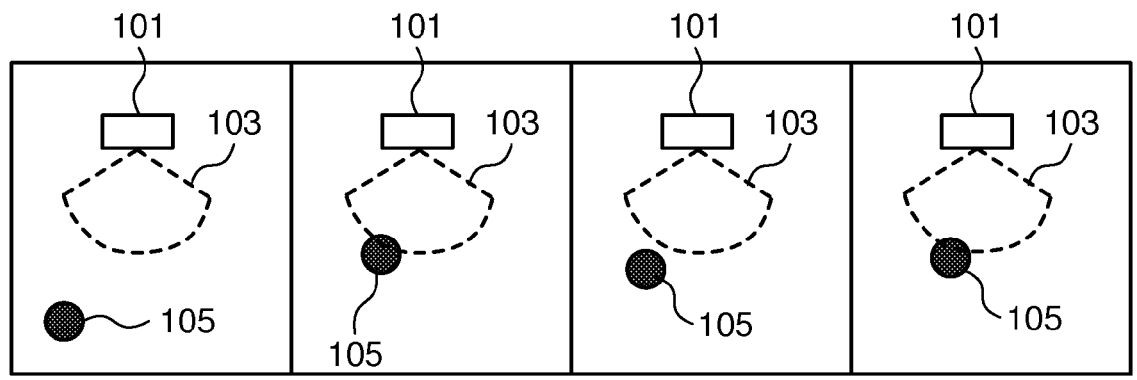
FIGS. 2a-d are simple schematics illustrating operation of the existing system of FIGS. 1a-d in which small movements of the user are detected.
Figure 3:
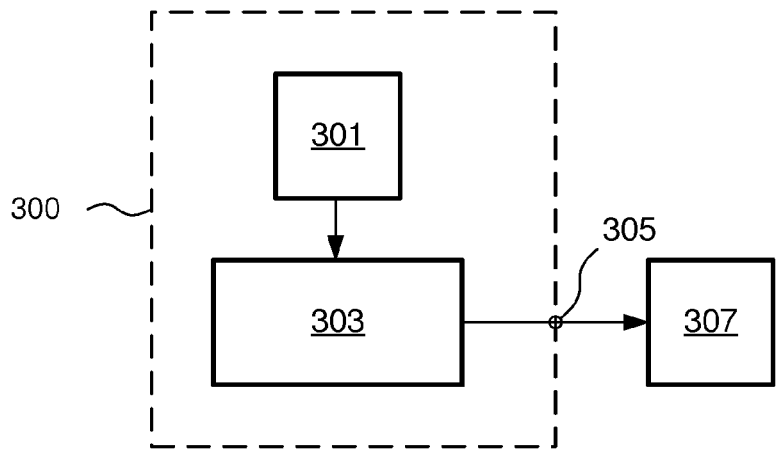
FIG. 3 is a simple schematic of the apparatus according to an embodiment of the present invention.
Figure 4:
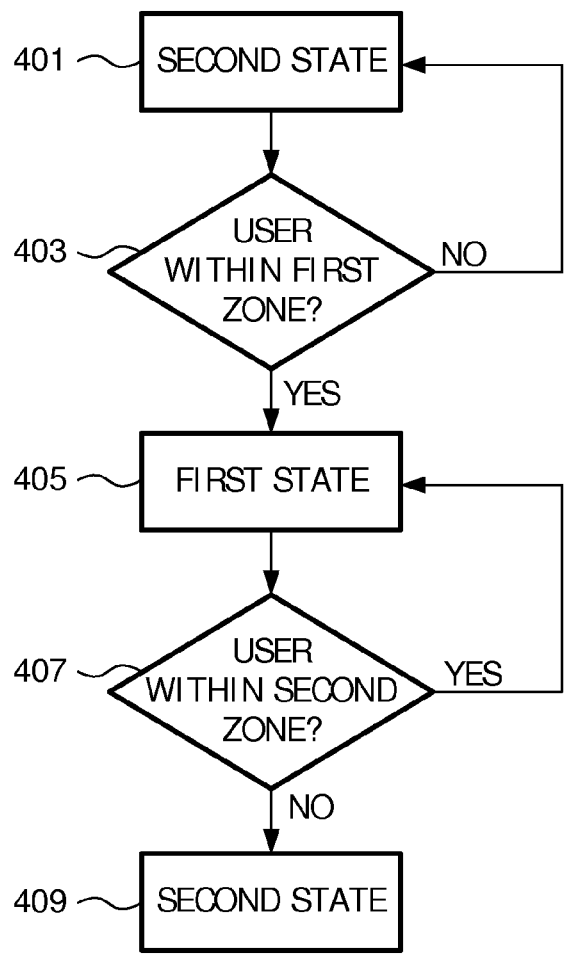
FIG. 4 is a flowchart of the method of controlling a device according to an embodiment of the present invention.

With reference to FIG. 3, the apparatus 300 comprises a detector 301 connected to a controller 303. The output of the controller 303 is connected to an output terminal 305 of the apparatus 300. The output terminal 305 is connected to a controllable device 307. The detector 301 may comprise at least one of an ultra sound sensor; passive infra-red sensor, radar video cameras, depth-sensing camera, audio sensors or a combination thereof. More than one detector may be used, for example to triangulate the position of the user.

Operation of the device will now be described with reference to FIGS. 4 to 7d.

The device 307 is controlled by the controller 303 such that the device has a second state which may be a default setting for the device such as, for example, the device is turned off, step 401. If the presence of a user is detected within a first, predetermined zone by the detector 301, step 403, the controller 303 changes the status of the device 307 from the second state to a first state, step 405, for example, the device 307 is activated. If the user moves outside of the first zone but remains in the second zone, the first state is maintained. If the presence of the user is detected outside of the second zone, step 407, the controller 303 returns the device 307 to its second state, step 409.

Figures 5A, 5B, 5C, 5D, 5E:
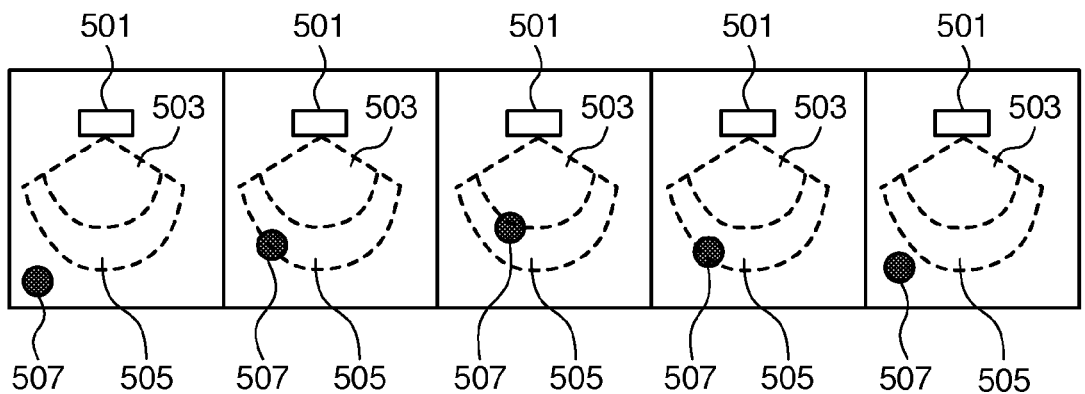
FIGS. 5a-e are simple schematics illustrating operation of the system according to an embodiment of the present invention in which large movements of the user are detected.

In particular, as shown in FIG. 5a, a user 507 is located outside first and second zones 503, 505. The first and second zones 503, 505 are predetermined and comprise areas within the vicinity of a device 501. The first zone 503 is an area defined by the line of sight of a detector located at the location of the device 501 and at a first, predetermined range of the device 501 and the second zone 505 is an area defined by the line of sight of the same detector located at the location of the device 501 and at a second, predetermined range of the device 501. As a result the first and second zones overlap such that the first zone 503 is wholly contained within the second zone 505.

In FIG. 5a, as the user 507 is located outside of the second zone 505, the device 501 is in a second state, i.e. is deactivated. As the user 507 approaches the second zone 505 and crosses the outer boundary of the second zone, as shown in FIG. 5b, the device 501 remains in its second state until the user 507 crosses the outer boundary of the first zone 503, as shown in FIG. 5c, whereupon the status of the device 501 is changed to "on", i.e. the device 501 is activated. If the user 507 moves away from the first zone 503 but remains within the second zone 505, as shown in FIG. 5d, the device 501 is maintained as activated and not until the user 507 is outside of the second zone 505, as shown in FIG. 5e, is the device 501 deactivated.

Figures 6A, 6B, 6C, 6D, 6E:
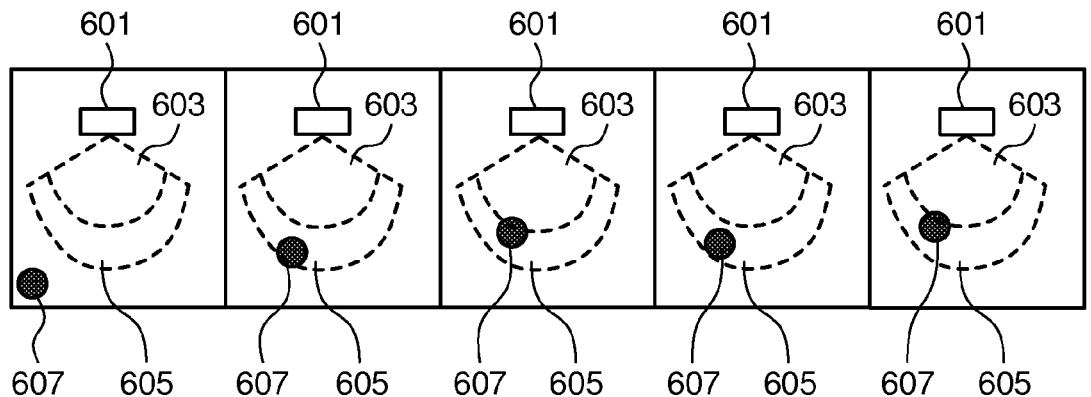
FIGS. 6a-e are simple schematics illustrating operation of the system according to an embodiment of the present invention in which small movements of the user within the first zone are detected.

Similarly, in FIG. 6a, as the user 607 is located outside of the second zone 605, the device 601 is in a second state, i.e. is deactivated. As the user 607 approaches the second zone 605 and crosses the outer boundary of the second zone 605, as shown in FIG. 6b, the device 601 remains in its second state until the user 607 crosses the outer boundary of the first zone 603, as shown in FIG. 6c, whereupon the status of the device

601 is changed to "on", i.e. the device 601 is activated. If the user 607 moves away from the first zone 603 but remains within the second zone 605, as shown in FIG. 6d, the device 601 is maintained as activated and if the user 607 moves back towards the first zone 603, as shown in FIG. 6e, the device 601 remains activated.

Figures 7A, 7B, 7C, 7D:
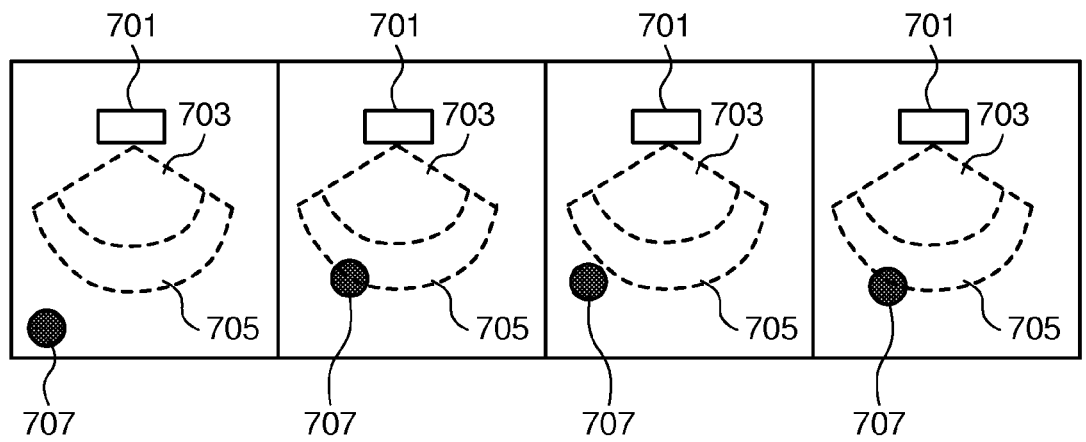
FIGS. 7a-d are simple schematics illustrating operation of the system according to an embodiment of the present invention in which small movements of the user outside the second zone are detected.

Further, as shown in FIG. 7a, as the user 707 is located outside of the second zone 705, the device 701 is in a second state, i.e. is deactivated. As the user 707 approaches the second zone 705 and crosses the outer boundary of the second zone 705, as shown in FIG. 7b, the device 701 remains in its second state. If the user 707 moves outside of the second zone 705, as shown in FIG. 7c, the status of the device 701 remains "off". If the user 707 moves back within the second zone 705, as shown in FIG. 7d, the device 701 remains in its "off" state.

As a result if the user hovers around the boundary of the zone of the device, the device does not flicker on and off.

This may be utilised for use with any user interface, such as a computer system, television, media player, hi-fi etc. It may also be utilised for lighting control. As result annoying flickering of the controlled device (e.g. lights flickering) is avoided due to continuous change in the device's status, and thus saving more energy. The resulting system is more stable and more intuitive.

In an alternative embodiment, the apparatus may comprise a processor, not shown here, in which the speed of travel of the user is determined. This may be achieved using the detector 301 of the first embodiment above. From the changes in the location over time, the speed of travel of the user can be determined. If the speed is lower than a certain threshold value, and when the user is within the first zone of the device, a certain status of the device is changed. This further improves the stability of the system by only activating it when the user is likely to have a need for activation i.e. is standing within the vicinity of the device or passes more slowly through a room etc.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method for controlling the status of a device, the method comprising the steps of:
   detecting the presence of a user;
   changing the status of a device to a first state if the presence of the user is detected within a first, predetermined zone;
   changing the status of said device to a second state if the presence of the user is detected outside a second, predetermined zone, said first, predetermined zone being smaller than said second, predetermined zone and said first, predetermined zone being wholly contained within said second, predetermined zone
   maintaining the current state of said device if the presence of the user is detected outside of said first, predetermined zone and within said second predetermined zone;
   determining the speed of travel of the user detected within said second, predetermined zone or said first predetermined zone; and
   detecting the user as present within said second, predetermined zone or said first, predetermined zone if the determined speed of travel is below a predetermined threshold value.

2. The method according to claim 1, wherein said first state comprises at least one setting of said device and said second state comprises at least one other setting of said device.

3. The method according to claim 1, wherein the step of changing the status of a device to a first state comprises activating said device and the step of changing the status of said device to a second state comprises deactivating said device.

4. The method according to claim 1 wherein the step of determining the speed of travel of a user comprises the steps of:
   detecting a first location of the user within said second, predetermined zone or said first, predetermined zone;
   detecting a second location of the user within said second, predetermined zone or said first, predetermined zone after a predetermined time interval; and
   determining the speed of travel of the detected user from the distance between the first and second locations and the predetermined time interval.

5. The method according to claim 1, wherein said first, predetermined zone and said second, predetermined zone are located within a vicinity of said device.

6. Apparatus for controlling the status of a device, the apparatus comprising:
   a detector configured to detect the presence of a user;
   a controller configured to change the status of a device to a first state if the presence of the user is detected within a first, predetermined zone, changing the status of said device to a second state if the presence of the user is detected outside a second, predetermined zone, said first, predetermined zone being smaller than said second, predetermined zone and said first, predetermined zone being wholly contained within said second, predetermined zone, and maintaining the current state of said device if the presence of the user is detected outside of said first, predetermined zone and within said second predetermined zone; and
   a processor configured to determine the speed of travel of the user detected within said second, predetermined zone or said first, predetermined zone, and detecting the user as present within said second, predetermined zone or said first, predetermined zone if the determined speed of travel is below a predetermined threshold value.

7. The apparatus according to claim 6, wherein said first state comprises at least one setting of said device and said second state comprises at least one other setting of said device.

8. The apparatus according to claim 6, wherein said controller changes the status of a device to a first state by activating said device and changes the status of said device to a second state by deactivating said device.

9. The apparatus according to claim 6, wherein said detector comprises at least one of an ultra sound sensor; passive infra-red sensor, radar video cameras, depth-sensing camera, audio sensors or a combination thereof.

10. A system for controlling the status of a device, the system comprising:
- a controllable device;
- a detector configured to detect the presence of a user;
- a controller configured to change the status of said controllable device to a first state if the presence of the user is detected within a first, predetermined zone, changing the status of said controllable device to a second state if the presence of the user is detected outside a second, predetermined zone, said first, predetermined zone being smaller than said second, predetermined zone and said first, predetermined zone being wholly contained within said second, predetermined zone, and maintaining the current state of said controllable device if the presence of the user is detected outside of said first, predetermined zone and within said second predetermined zone; and
- a processor configured to determine the speed of travel of the user detected within said second, predetermined zone or said first, predetermined zone, and detecting the user as present within said second, predetermined zone or said first, predetermined zone if the determined speed of travel is below a predetermined threshold value.

* * * * *